United States Patent
Grant

(10) Patent No.: US 8,224,314 B2
(45) Date of Patent: Jul. 17, 2012

(54) REDUCED-COMPLEXITY COORDINATED MULTIPOINT RECEPTION

(75) Inventor: Stephen Grant, Pleasanton, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 447 days.

(21) Appl. No.: 12/645,616

(22) Filed: Dec. 23, 2009

(65) Prior Publication Data

US 2011/0080879 A1 Apr. 7, 2011

Related U.S. Application Data

(60) Provisional application No. 61/249,392, filed on Oct. 7, 2009.

(51) Int. Cl.
*H04W 4/00* (2009.01)
*H04W 40/00* (2009.01)

(52) U.S. Cl. .................... 455/422.1; 455/446

(58) Field of Classification Search ........... 455/422.1, 455/446–450, 525, 452.1, 452.2, 453, 561, 455/562.1; 370/328–329, 335
See application file for complete search history.

(56) References Cited

U.S. PATENT DOCUMENTS

| | | | |
|---|---|---|---|
| 6,308,085 B1 | 10/2001 | Shoki | |
| 8,009,646 B2* | 8/2011 | Lastinger et al. | 370/338 |
| 2008/0239938 A1* | 10/2008 | Jalloul et al. | 370/201 |
| 2010/0323611 A1* | 12/2010 | Choudhury | 455/7 |
| 2011/0034175 A1* | 2/2011 | Fong et al. | 455/450 |

FOREIGN PATENT DOCUMENTS

| | | |
|---|---|---|
| EP | 1 172 941 A2 | 1/2002 |
| EP | 1 587 338 A2 | 10/2005 |
| WO | WO 00/16494 A1 | 3/2000 |
| WO | WO 2004/008655 A1 | 1/2004 |
| WO | WO 2007/040456 A2 | 4/2007 |

OTHER PUBLICATIONS

Motorola: "LTE-A Multiple Point Coordination and Its Classification", 3GPP Draft; RI-083229 LTE-A Multi-Point Coordination Motorola, 3rd Generation Partnership Project (3GPP).
ETRI: "Coordinated multi-cell transmission for LTE-Advanced downlink", 3GPP Draft; R1-082896 Multi-Cell MIMO, 3rd Generation Partnership Project (3GPP).

* cited by examiner

*Primary Examiner* — Brandon Miller

(57) ABSTRACT

Teachings herein offer reduced-complexity coordinated multipoint (CoMP) reception of an uplink signal transmitted by a mobile terminal. The teachings obtain, for each sector antenna in a set of sector antennas deployed in a CoMP cell, a signal strength measurement of one or more downlink signals received by the mobile terminal from a sector associated with that sector antenna. The teachings compare the signal strength measurements and then select from the set, based on that comparison, a subset of sector antennas for CoMP reception of the uplink signal. By using a subset of sector antennas for CoMP reception, instead of all sector antennas in the set, the teachings reduce the computational complexity of CoMP reception. Moreover, the teachings in some embodiments minimize any performance degradation possibly resulting from performing CoMP reception with a reduced number of antennas, by selecting the subset to include sector antennas having the strongest signal strength measurements.

20 Claims, 5 Drawing Sheets

US 8,224,314 B2

REDUCED-COMPLEXITY COORDINATED MULTIPOINT RECEPTION

RELATED APPLICATIONS

This application claims priority under 35 U.S.C. §119(e) from the U.S. Provisional Patent Application with Ser. No. 61/249,392, filed on 7 Oct. 2009, and entitled "Antenna Site Selection for Uplink CoMP."

TECHNICAL FIELD

The present invention relates generally to coordinated multipoint (CoMP) reception of uplink signals in a wireless communication network and, more particularly, to a method and apparatus for reducing the complexity of CoMP reception of uplink signals.

BACKGROUND

The phenomenal growth in the demand for wireless communications has put persistent pressure on wireless network operators to improve the capacity of their communication networks. To improve the spectral efficiency of these networks, scarce radio resources have to be reused aggressively in neighboring cells. As a result, inter-cell interference has become a main source of signal disturbance, limiting not only the service quality to users at the cell edges, but also the overall system throughput.

Coordinated multipoint (CoMP) reception in the uplink is one technique being considered for mitigating inter-cell interference in IMT-Advanced systems. CoMP reception differs from reception in a conventional system in that uplink signals are received at multiple antennas deployed across several adjacent cell sites (i.e., radio access points), and then transported to a common location for joint processing. In effect, this architecture forms a "super-cell," called a CoMP cell, where uplink signals that would have been treated by a conventional cell as inter-cell interference are instead treated by the CoMP cell as desired signals. The mitigation in inter-cell interference is expected to significantly improve system performance, especially for users near the edge of a conventional cell.

Joint processing of the received uplink signals, however, requires significant and potentially prohibitive computational complexity. Multi-antenna Generalized RAKE receivers, for example, are particularly well suited for joint processing in CoMP cells of High Speed Packet Access (HSPA) systems, given their ability to suppress other-user interference. Yet the computational complexity of multi-antenna G-RAKE receivers grows with the number of antennas used for CoMP reception, as well as with the number of fingers allocated to each antenna. As CoMP reception is most effective with a large number of antennas and with a large number of fingers allocated to each antenna, computational complexity is a significant limiting factor in the performance of CoMP reception.

SUMMARY

Teachings herein offer reduced-complexity coordinated multipoint (CoMP) reception of an uplink signal transmitted by a mobile terminal. Instead of using all sector antennas in the set of sector antennas deployed across a CoMP cell for CoMP reception of the uplink signal, the teachings use only a subset of those antennas. This subset is selected based on signal strength measurements of one or more downlink signals obtained for each sector antenna. To minimize any performance degradation that may result from performing CoMP reception with a reduced number of antennas, the teachings may for example select the subset to include sector antennas having the strongest signal strength measurements.

More particularly, teachings herein include a method for reduced-complexity CoMP reception of an uplink signal transmitted by a mobile terminal. The method includes obtaining, for each sector antenna in a set of sector antennas deployed in a CoMP cell, a signal strength measurement of one or more downlink signals received by the mobile terminal from a sector associated with that sector antenna. The one or more downlink signals may include, for instance, a common pilot signal received from each sector. The method further includes comparing the signal strength measurements obtained for the sector antennas in the set, and then selecting from the set, based on that comparison, a subset of sector antennas for CoMP reception of the uplink signal.

In some embodiments, the method includes selecting from the set a pre-determined number of sector antennas that are associated with sectors providing the strongest downlink signals to the mobile terminal. Selecting the subset in this way reduces the computational complexity of CoMP reception while also minimizing any performance degradation that might result from performing CoMP reception of an uplink signal with a reduced number of sector antennas.

Teachings herein also include a network node in a wireless communication network that includes one or more processing circuits configured to perform the method described above. The network node may be, for example, either a base station or a radio network controller (RNC). Where the base station is configured to perform the method, the base station both selects the subset of sector antennas and also performs CoMP reception of the uplink signal using the selected subset. Where the RNC performs the method, the RNC selects the subset and then sends one or more control messages to the base station identifying the selected subset to the base station for CoMP reception processing.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
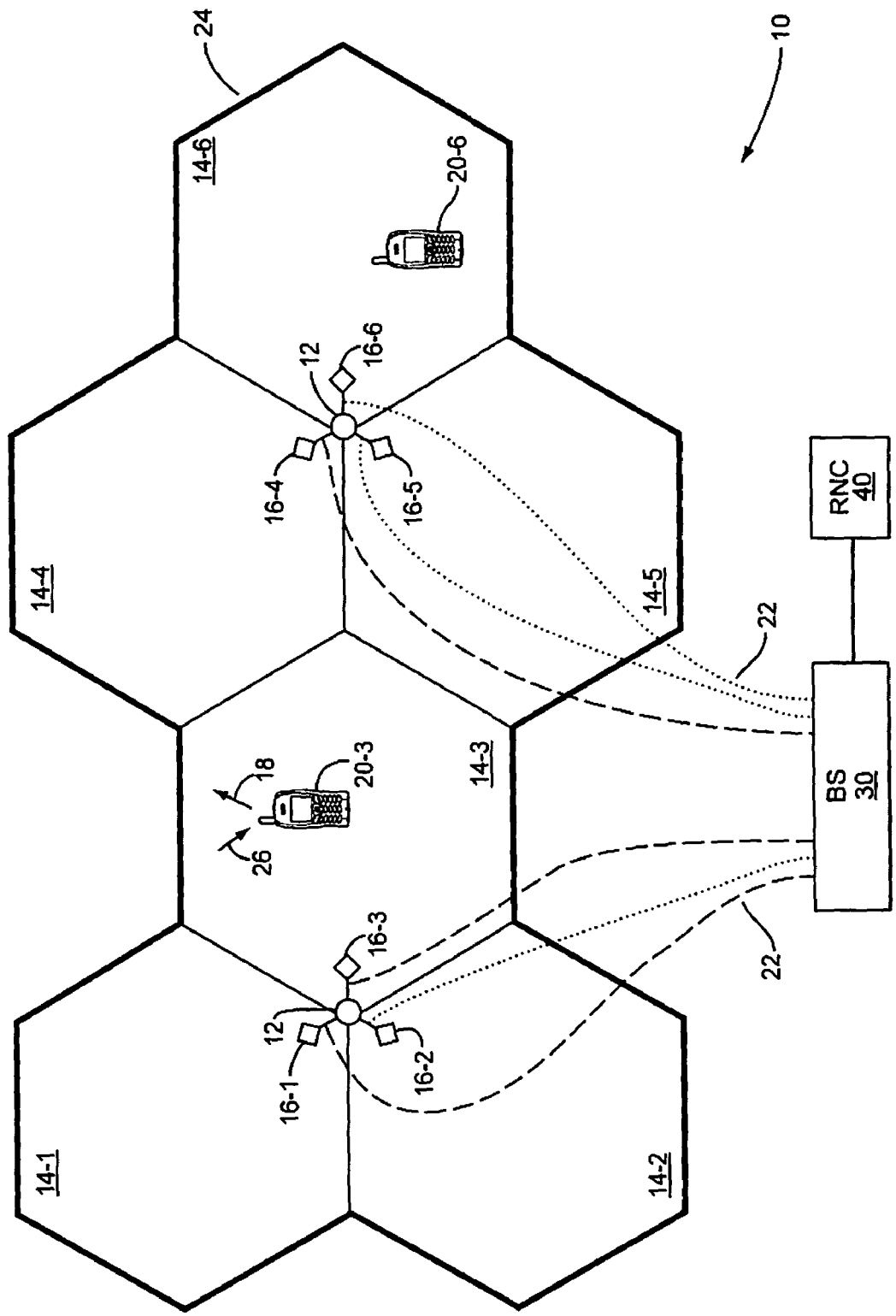
FIG. 1 illustrates a wireless communication network employing coordinated multipoint (CoMP) reception according to one embodiment of the present invention.

FIG. 1 illustrates a wireless communication network 10 according to one embodiment of the present invention. The wireless communication network 10 includes radio access points 12 distributed across the network's coverage area for serving different sectors 14 of that coverage area. As shown, each radio access point 12 is located near the edge of a number of sectors 14, and is deployed with at least that many sector antennas 16. Each sector antenna 16-*x* serves an associated sector 14-*x*, such as by receiving uplink signals from mobile terminals 20-*x* in that sector 14-*x* (note that a sector antenna 16-*x* may serve an associated sector 14-*x* by also transmitting one or more downlink signals to mobile terminals 20-*x* in that sector 14-*x*, or the sector 14-*x* may have another, separate sector antenna not shown in FIG. 1 that transmits in the downlink).

Of course, a sector antenna 16-*x* associated with a given sector 14-*x* may nonetheless receive an uplink signal transmitted by a mobile terminal 20-*y* in a different sector 14-*y*. For example, the sector antenna 16-4 associated with sector 14-4 may receive an uplink signal 18 transmitted by mobile terminal 20-3 in sector 14-3, as may other sector antennas 16-1 . . . 16-6. Each sector antenna 16 therefore receives a composite signal that includes uplink signals transmitted from many mobile terminals 20 and from various sectors 14. Instead of separately processing each composite signal and treating uplink signals transmitted from mobile terminals 20 in other sectors 14 as inter-cell interference, as done in conventional networks, the wireless communication network 10 employs coordinated multipoint (CoMP) reception. Employing CoMP reception, the radio access points 12 transport the composite signal from each sector antenna 16, e.g., via fiber optic cables 22, to base station (BS) 30 for joint processing.

This effectively makes the sectors 14-1 . . . 14-6 a "supercell," referred to herein as CoMP cell 24, which has improved performance near sector edges.

Known approaches to CoMP reception suggest using the entire set of sector antennas 16 deployed in the CoMP cell 24 for CoMP reception of each uplink signal. For example, for CoMP reception of the uplink signal 18 transmitted by mobile terminal 20-3, the base station 30 in known approaches would jointly process the composite signals from all sector antennas 16 in the CoMP cell 24, namely sector antennas 16-1, 16-2, 16-3, 16-4, 16-5, and 16-6. The base station 30 would do the same for uplink signals transmitted by other mobile terminals 20, including mobile terminal 20-6.

On the contrary, the network 10 as taught herein uses a subset of the sector antennas 16 deployed in the CoMP cell 24 for CoMP reception of an uplink signal. For CoMP reception of the uplink signal 18 transmitted by mobile terminal 20-3, for instance, the base station 30 may jointly process only the composite signals from sector antennas 16-1, 16-3, and 16-4 (this example selection is illustrated in FIG. 1 with the cables 22 associated with those sector antennas being in bold). A different subset may be used for CoMP reception of an uplink signal transmitted by other mobile terminals 20, like mobile terminal 20-6. As discussed in more detail below, by only using a subset of sector antennas 16 for CoMP reception of an uplink signal, the network 10 reduces the computational complexity of CoMP reception, and in some cases even increases the performance of CoMP reception.

Figure 2:
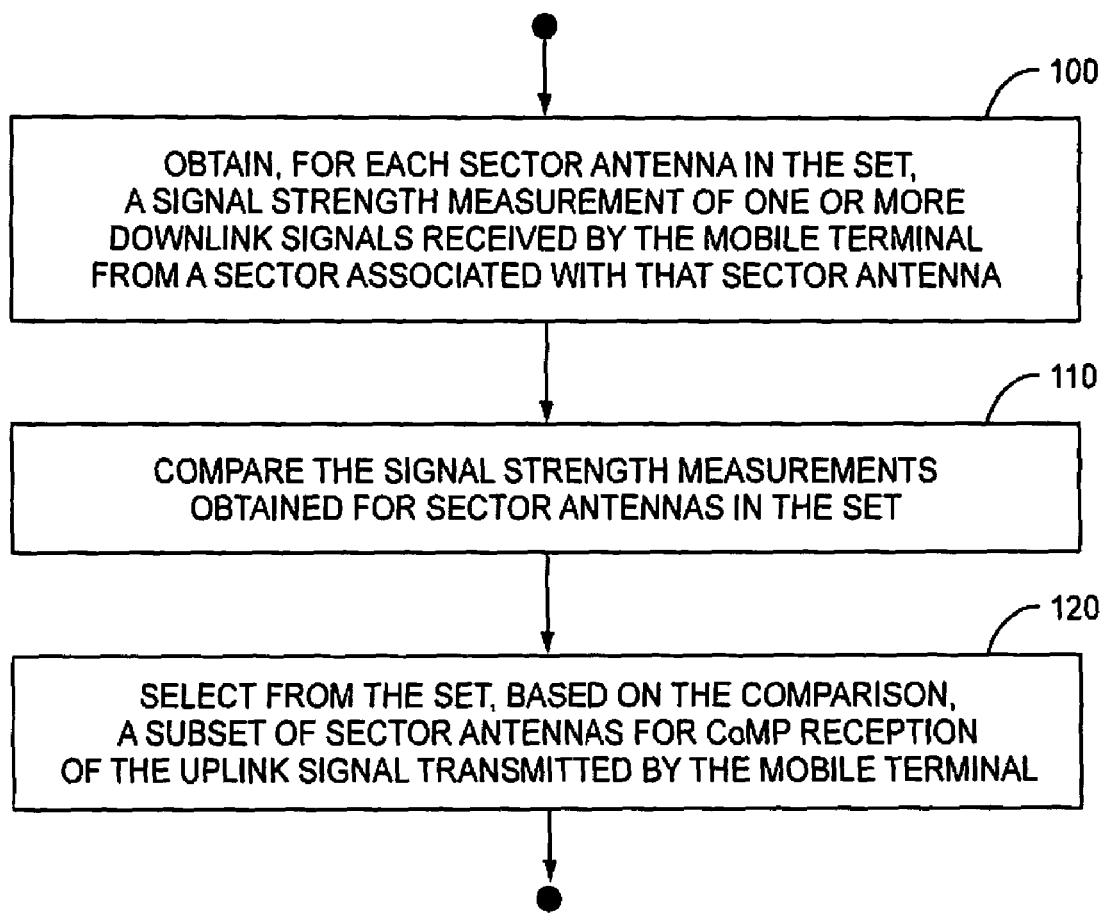
FIG. 2 is a logic flow diagram illustrating one embodiment of a method for reduced-complexity CoMP reception of an uplink signal transmitted by a mobile terminal.

The network 10 selects the subset of sector antennas 16 to use for CoMP reception of an uplink signal transmitted by a given mobile terminal 20 according to the method in FIG. 2. In FIG. 2, the network 10 obtains, for each sector antenna 16-*x* in the set of sector antennas 16-1 . . . 16-X deployed in the CoMP cell 24, a signal strength measurement of one or more downlink signals received by the mobile terminal 20 from a sector 14-*x* associated with that sector antenna 16-*x* (Block 100). In one embodiment, for example, the mobile terminal 20 receives a common pilot signal from each sector 14-*x*, measures the signal strength of each common pilot signal, and reports those measurements back to the network 10. In this case, the network 10 obtains signal strength measurements of the common pilot signals received by the mobile terminal 20 from the sectors 14 in the set. This embodiment is particularly advantageous for at least HSPA-based networks, where the network 10 already receives signal strength measurements of a common pilot signal according to HSPA standards, for radio resource management (e.g., cell selection and active set updates for soft handover).

In any event, the network 10 then bases its selection of the subset of sector antennas 16 to use for CoMP reception of the uplink signal, based on the measurements of signal strength in the downlink. Specifically, the network 10 compares the signal strength measurements obtained for sector antennas 16 in the set (Block 110) and selects from the set, based on that comparison, a subset of sector antennas 16 for CoMP reception of the uplink signal (Block 120).

In some embodiments, for instance, the network 10 selects from the set a pre-determined number of sector antennas 16 that are associated with sectors 14 providing the strongest downlink signals to the mobile terminal 20, according to the signal strength measurements obtained. Assume, for example, that the signal strength measurements obtained by the network 10 indicate that sectors 14-1, 14-3, and 14-4 provide the strongest downlink signals to the mobile terminal 20-3. If the network 10 is configured to select from the set of sector antennas 16-1 . . . 16-6 three sector antennas associated with sectors 14-1 . . . 14-6 providing the strongest downlink signals to the mobile terminal 20-3, the network 10 selects the subset to include sector antennas 16-1, 16-3, and 16-4 (again, this example selection is indicated in FIG. 1 with the cables 22 associated with those sector antennas being in bold).

Selecting the subset in this way reduces the computational complexity of CoMP reception while also minimizing any performance degradation that might result from performing CoMP reception of an uplink signal with a reduced number of sector antennas 16. In particular, the network 10 assumes channel reciprocity between the uplink and downlink (i.e., that the path loss, shadowing, and antenna pattern are approximately the same for uplink and downlink signals). Based on this assumption, the network uses the strength of a downlink signal received by a mobile terminal 20 from a sector 14-*x* as an approximation of the strength of the uplink signal received by an associated sector antenna 16-*x* from the mobile terminal 20, at least on average. Accordingly, by selecting the subset to include sector antennas 16 associated with sectors 14 providing the strongest downlink signals to a mobile terminal 20, the network 10 selects sector antennas 16 that on average receive the strongest uplink signal from the mobile terminal 20.

Indeed, not all sector antennas 16 receive a mobile terminal's uplink signal with the same signal strength. That is, because at least two sector antennas 16 in the set are often deployed in the CoMP cell 24 at different, geographically separated radio access points 12, each sector antenna's main lobe may not be directed toward the mobile terminal 20. In FIG. 1, for instance, sector antennas 16-2, 16-5, and 16-6 have main lobes directed mostly away from the mobile terminal 20-3. These sector antennas therefore may not receive the mobile terminal's uplink signal 18 with as strong of signal strength as sector antennas 16-1, 16-3, and 16-4. Thus, not selecting sector antennas 16-2, 16-5, or 16-6 to use for CoMP reception of the mobile terminal's uplink signal 18 may result in only minimal performance degradation.

Of course, even though sector antennas 16-1, 16-3, and 16-4 may each receive the mobile terminal's uplink signal 18 with a stronger signal strength than any of sector antennas 16-2, 16-5, or 16-6, selecting all three of them for inclusion in the subset may actually result in worse performance than if even fewer (e.g., only two) were selected. If, for example, sector antenna 16-1 receives the mobile terminal's uplink signal 18 with only a very weak signal strength (albeit stronger than sector antennas 16-2, 15-6, or 16-6), then the errors that would result in channel estimation if sector antenna 16-1 were used for CoMP reception may cause worse performance than if sector antenna 16-1 were not used at all.

Thus, in one embodiment, the network 10 is further configured to refine the subset by removing one or more sector antennas 16 that are associated with sectors 14 providing downlink signals having signal strength measurements below a pre-determined strength threshold. Continuing the example above, then, the network 10 would remove sector antenna 16-1 from the subset, if the signal strength measurements for that sector antenna 16-1 were below the pre-determined strength threshold, and thus would use only sector antennas 16-3 and 16-4 for CoMP reception of the uplink signal 18.

Figure 3:
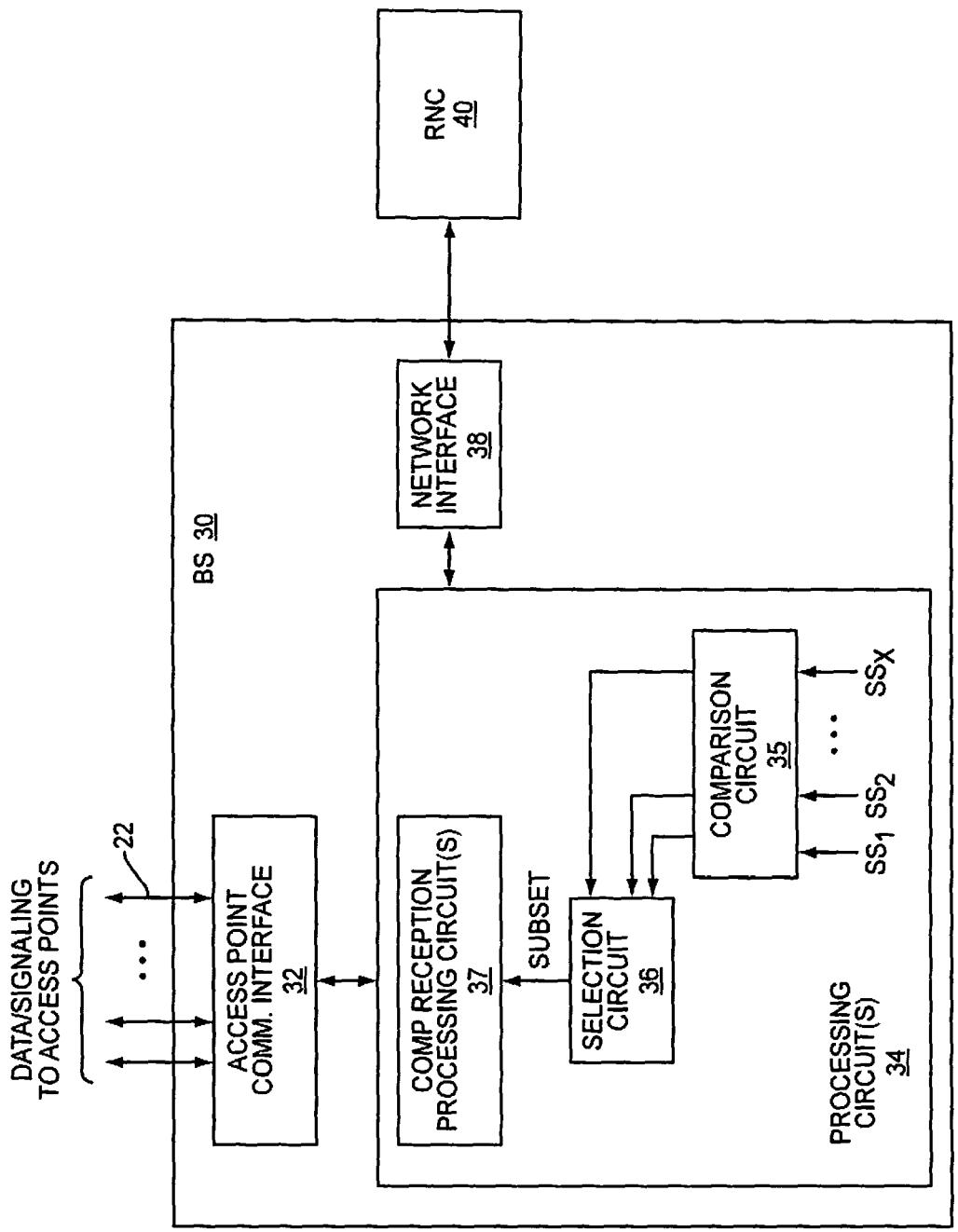
FIG. 3 is a functional block diagram of a base station configured for reduced-complexity CoMP reception according to one embodiment of the present invention.

Note that the above selection may be performed by a node in the network 10, such as by the base station 30 or an associated radio network controller (RNC) 40. FIG. 3, for example, illustrates the base station 30 as including an access point communication interface 32, one or more processing circuits 34, and a network interface 38. The access point communication interface 32 communicatively couples the base station 30 to the radio access points 12 for receiving composite signals therefrom (e.g., via fiber optic cables 22), and for otherwise sending and receiving user data and/or control signaling from mobile terminals 20. The network interface 38 communicatively couples the base station 30 to the radio network controller 40. Finally, the one or more processing circuits 34 are configured to select a subset of sector antennas 16 for CoMP reception of an uplink signal transmitted by a given mobile terminal 20, as described above.

The one or more processing circuits 34 as shown include a comparison circuit 35, a selection circuit 36, and CoMP reception processing circuit(s) 37. The comparison circuit 35 receives as input signal strength measurements $SS_1 \ldots SS_x$ for each sector antenna 16 in the set of sector antennas 16 deployed in the CoMP cell 24. These signal strength measurements $SS_1, \ldots SS_x$ may be received from the RNC 40 via the network interface 38 (e.g., as in the case of an HSPA-based network where the signal strength measurements $SS_1$, $\ldots SS_x$ are reported to the RNC 40 for radio resource management). The comparison circuit 35 compares the signal strength measurements $SS_1 \ldots SS_x$ and provides to the selection circuit 36 an indication of that comparison (e.g., a list of sector antennas 16 sorted based on the signal strength measurements $SS_1 \ldots SS_x$). The selection circuit 36 selects from the set, based on the comparison, a subset of sector antennas 16, such as a subset that includes a pre-determined number of sector antennas 16 associated with the strongest signal strength measurements $SS_1 \ldots SS_x$. The CoMP reception processing circuit(s) 37 then perform CoMP reception of the uplink signal transmitted by the mobile terminal 20 using the selected subset of sector antennas 16.

In one embodiment, the CoMP reception processing circuit (s) 37 perform CoMP reception of an uplink signal received from a given mobile terminal 20 by jointly processing the composite signals received from sector antennas 16 in the selected subset. More particularly, each sector antenna 16 may consist of one or more physical antennas (not shown), depending on the level of diversity employed in each sector 14. For example, if dual-diversity is employed in a sector 14, that sector antenna 16 consists of two physical antennas. Each physical antenna receives a composite signal, whereupon the radio access point 12 associated with that antenna samples the received composite signal and transports those data samples to the base station 30. The base station 30, therefore, actually obtains, from each physical antenna associated with a sector antenna 16 in the set, data samples of a composite signal received by that physical antenna. The CoMP reception processing circuit(s) 37 then detect the uplink signal transmitted by the mobile terminal 20 for which CoMP reception is being performed, by jointly processing data samples obtained from those physical antennas associated with sector antennas 16 in the selected subset.

Where the CoMP reception processing circuit(s) 37 implement a multi-antenna Generalized RAKE receiver, for instance, the circuit(s) 37 allocate a plurality of RAKE fingers among the physical antennas that are used for CoMP reception of the uplink signal. In one embodiment, the circuit(s) 37 allocate RAKE fingers among the physical antennas based on the signal strength measurements obtained for their associated sector antennas 16. The circuit(s) 37 may, for example, allocate more fingers to physical antennas that are associated with stronger signal strength measurements than to those physical antennas that are associated with weaker signal strength measurements. Regardless, the circuit(s) 37 correlate data samples obtained from the physical antennas to a spreading code assigned to the mobile terminal 20, at a plurality of delays set for the RAKE fingers. This produces a plurality of despread values. The CoMP reception processing circuit(s) 37 then compute combining weights w for combining the plurality of despread values. The combining weights w are determined jointly for the overall set of RAKE fingers allocated amongst the physical antennas as $w=R^{-1}c$, where c is a vector of estimated channel coefficients and R is an impairment covariance matrix. The impairment covariance matrix R describes the correlation between the impairment on different fingers of the physical antennas used for CoMP reception of the uplink signal; that is, impairment correlations between fingers allocated to different physical antennas.

The computational complexity required to form and invert the impairment covariance matrix R is $O(N^3)$ where $N=X \times N_F$, X is the number of physical antennas used for CoMP reception of the uplink signal, and $N_F$ is the number of fingers allocated to each physical antenna (assuming that each physical antenna is allocated the same number of fingers; in general, however, different physical antennas may be allocated a different number of fingers). Notably, by using only those physical antennas associated with sector antennas 16 in the selected subset for CoMP reception of the uplink signal, the circuit(s) 37 reduce X and hence reduce the computational complexity required to form and invert the impairment covariance matrix R.

Assume, for example, that the network 10 in FIG. 1 employs dual diversity such that each sector antenna 16 consists of two physical antennas. If the circuit(s) 37 were to use the entire set of six sector antennas 16-1 . . . 16-6 deployed in the CoMP cell 24 for CoMP reception of the uplink signal 18 transmitted by mobile terminal 20-3, X would be equal to 6 sector antennas used·2 physical antennas per sector antenna=12. The computational complexity required for the circuit(s) 37 to form and invert the impairment covariance matrix R in this case would then be $O(N^3)$ where $N=12 \times N_F$. On the contrary, according to the teachings herein, the circuit (s) 37 only use those sector antennas 16 in the subset selected by the selection circuit 36 for CoMP reception of the uplink signal 18. If the selection circuit 36 selects only three out of the six sector antennas 16 in the set, X is only equal to 3 sector antennas used·2 physical antennas per sector antenna=6, meaning that the computational complexity required to form and invert the impairment covariance matrix R is substantially reduced to only $O(N^3)$ where $N=6\times N_F$. Thus, by configuring the number of sector antennas 16 that the selection circuit 36 selects for inclusion in the subset, the computational complexity of CoMP reception can be controlled.

Figure 4B:
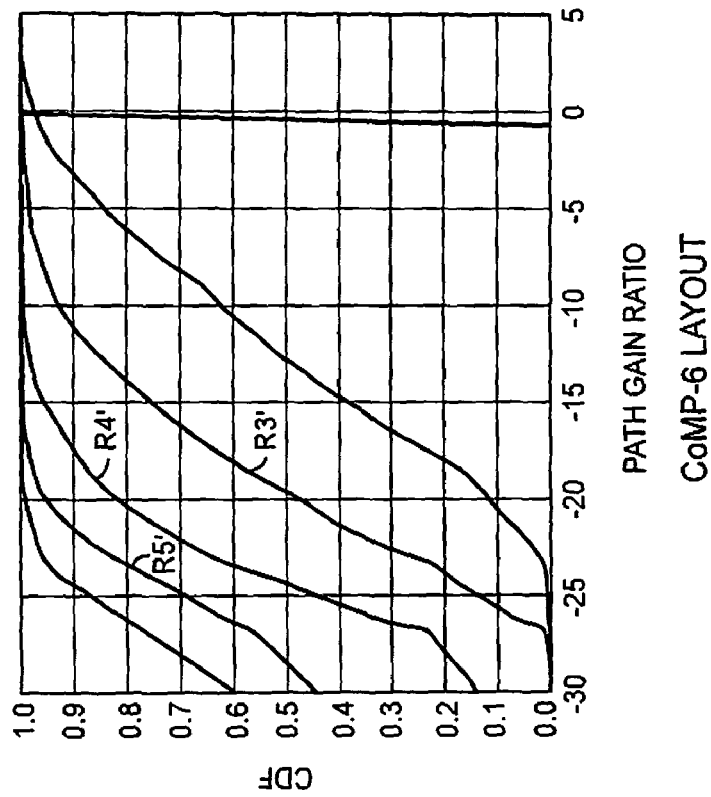
FIGS. 4A and 4B are plots of the ratio of path gains for two different CoMP cell layouts, CoMP-3 and CoMP-6 respectively.
Figure 4A:
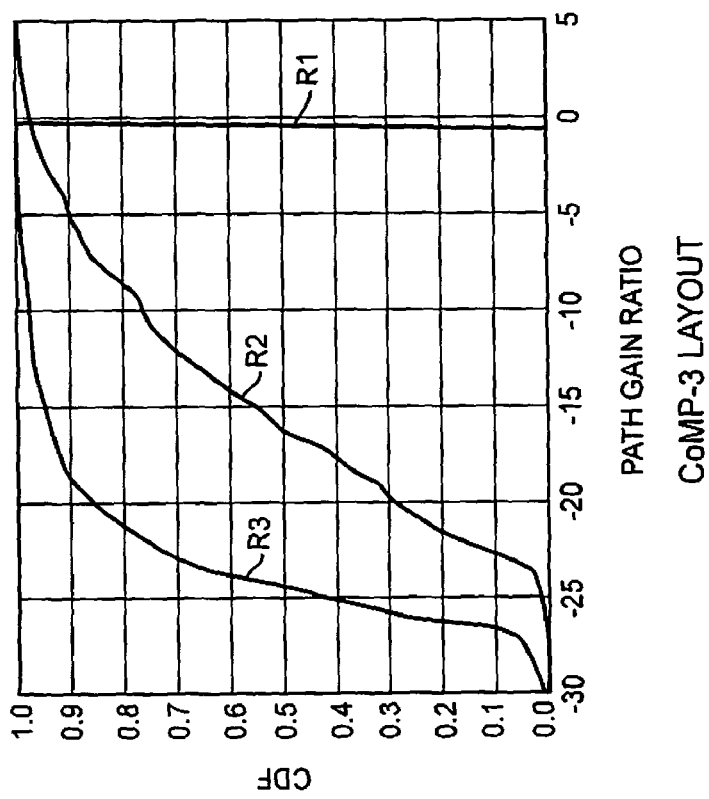
Figure 5:
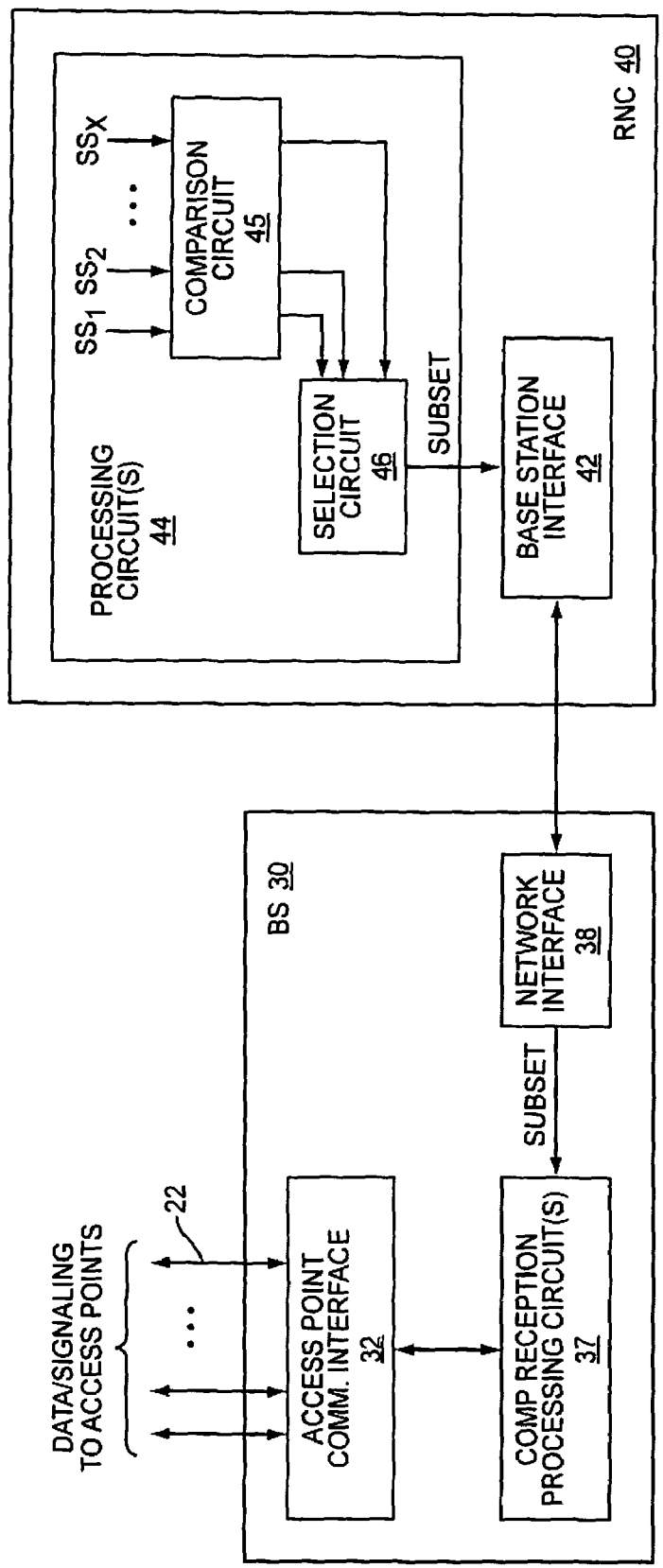
FIG. 5 is a functional block diagram of a radio network controller configured for reduced-complexity CoMP reception according to one embodiment of the present invention.

The number of sector antennas 16 to select in order to reduce computational complexity, while at the same time minimizing any performance degradation, may depend on the CoMP cell size or layout. FIGS. 4A and 4B, for example, illustrate the cumulative distribution function (CDF) of the ratio of path gains corresponding to the sectors within a CoMP cell for two different CoMP cell layouts, one with 1 radio access point 12 that has 3 sector antennas (CoMP-3 layout) and another with 2 radio access points 12 that each have 3 sector antennas (CoMP-6 layout). With respect to the CoMP-3 layout in FIG. 4A, the ratio R1 is the ratio of the strongest path gain to the strongest path gain; hence the ratio R1 is 0 dB. Moving to the left, the ratio R2 is the ratio of the second strongest path gain to the strongest path gain, and the next ratio R3 is the ratio of the third strongest path gain to the strongest path gain. The more negative the ratio for a particular path gain, the less benefit a sector antenna 16 for that path gain would provide to the performance of CoMP reception. For example, the ratio R2 is approximately −5 dB measured at the 90th percentile of the CDF, but the ratio R3 also measured at the 90th percentile drops to approximately −20 dB. Accordingly, most of the benefit to the performance of CoMP reception may be realized from selecting for inclusion in the subset only two sector antennas 16 for the two strongest path gains. Moreover, by selecting only two sector antennas 16 instead of three, the computational complexity of such CoMP reception will be reduced.

With respect to the CoMP-6 layout in FIG. 4B, by contrast, the ratio R3' of the third strongest path gain to the strongest path gain is approximately −10 dB measured at the 90th percentile, rather than −20 dB as for the CoMP-3 layout in FIG. 4A. Indeed, it's not until the ratios R4' and R5' of the fourth and fifth strongest paths that the ratio drops close to −20 dB. Thus, some additional benefit to the performance of CoMP reception may be realized from selecting for inclusion in the subset at least three sector antennas 16 for the three strongest path gains, instead of just two as in the CoMP-3 layout.

With this example of a CoMP-3 layout (i.e., a single radio access point 12), those skilled in the art will readily appreciate that FIG. 1 is merely illustrative of one possible CoMP cell layout and is therefore non-limiting. That is, FIG. 1 illustrates a CoMP-6 layout with two radio access points 12 and three sector antennas 16 per radio access point 12. However, those skilled in the art will understand that there may be any number of radio access points 12 and any number of sector antennas 16 per radio access point 12. In one embodiment, for example, there is only one radio access point 12, such that all of the sector antennas 16 are located at substantially the same geographic location. In other embodiments, there are more than one radio access point 12, meaning that at least two of the sector antennas in the set are deployed at different, geographically separated radio access points 12 of the CoMP cell.

Those skilled in the art will also appreciate that, as mentioned above, the selection of a subset of sector antennas 16 may be performed by another node in the network 10 other than the base station 30 as described with respect to FIG. 3. Indeed, FIG. 4 illustrates one example where the selection is alternatively performed in the RNC 40.

In FIG. 4, the RNC 40 includes a base station interface 42 and one or more processing circuits 44. The base station interface 42 communicatively couples the RNC 40 to the base station 30. The one or more processing circuits 44 include a comparison circuit 45 and a selection circuit 46 much like the comparison circuit 35 and selection circuit 36 described in FIG. 3. Specifically, the comparison circuit 45 receives as input signal strength measurements $SS_1 \ldots SS_x$ for each sector antenna 16 in the set of sector antennas 16 deployed in the CoMP cell 24, compares those signal strength measurements $SS_1 \ldots SS_x$, and provides an indication of that comparison to the selection circuit 46. The selection circuit 46 selects from the set, based on the comparison, a subset of sector antennas 16.

The RNC 40 then sends one or more control messages to the base station 30, via the base station interface 42, that identify to the base station 30 the subset selected by the selection circuit 46. The base station 30 receives the one or more control messages via the network interface 38, whereupon the CoMP reception processing circuit(s) 37 of the base station 30 perform CoMP reception of the uplink signal using the sector antennas 16 in the subset as described above.

To support communication of the selected subset from the RNC 40 to the base station 30 in the embodiment of FIG. 4, or communication of downlink signal strength measurements from the RNC 40 to the base station 30 in the embodiment of FIG. 3, additional control signaling may need to be defined in the applicable communication interface standard. However, at least in the case where the network 10 comprises an HSPA-based network, minimal modification to existing HSPA control signaling is required, since the RNC already communicates active set information to the base station 30 in order to assist softer handover. Of course, no particular communication interface standard is necessary for practicing the present invention. The wireless network 10, therefore, may be any one of a number of standardized network implementations, including CDMA (IS-95, IS-2000), wide band CDMA (W-CDMA), Long Term Evolution (LTE), LTE-Advanced, or other type of wireless communication network.

Furthermore, those skilled in the art will appreciate that the present invention has been described mostly with respect to a single CoMP cell 24 and one of the mobile terminals 20-3 in that cell 24 merely for ease of illustration. CoMP reception as described herein, of course, is performed for each mobile terminal 20 in a CoMP cell, based on downlink signal strength measurements specific to each mobile terminal 20. Moreover, CoMP reception of the same uplink signal as described may be performed by more than just one CoMP cell, as in the case where a mobile terminal 20 is in soft handoff between adjacent CoMP cells. In this case, CoMP reception is performed as described above nearly simultaneously in the adjacent CoMP cells. Of course, the subset of sector antennas 16 selected in each CoMP cell may be different since the downlink signal strength measurements obtained will likely be different. The first CoMP cell to receive and decode the signal correctly first, forwards it to the RNC 40.

Those skilled in the art will also appreciate that the various "circuits" described may refer to a combination of analog and digital circuits, including one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a wireless communication network for reduced-complexity coordinated multipoint (CoMP) reception of an uplink signal transmitted by a mobile terminal, the method comprising:
   obtaining, for each sector antenna in a set of sector antennas deployed in a CoMP cell, a signal strength measurement of one or more downlink signals received by said mobile terminal from a sector associated with that sector antenna;
   comparing the signal strength measurements obtained for sector antennas in the set; and
   selecting from the set, based on said comparison, a subset of sector antennas for CoMP reception of the uplink signal transmitted by said mobile terminal.

2. The method of claim 1, wherein selecting from the set, based on said comparison, a subset of sector antennas for CoMP reception of said uplink signal comprises selecting from the set a pre-determined number of sector antennas that are associated with sectors providing the strongest downlink signals to said mobile terminal, according to the signal strength measurements obtained.

3. The method of claim 2, further comprising refining the subset according to the signal strength measurements obtained by removing one or more sector antennas that are associated with sectors providing downlink signals having signal strength measurements below a pre-determined strength threshold.

4. The method of claim 1, wherein obtaining a signal strength measurement of one or more downlink signals received by said mobile terminal from a sector comprises obtaining a signal strength measurement of a common pilot signal received by said mobile terminal from the sector.

5. The method of claim 1, wherein the method is implemented by a base station associated with said CoMP cell, said base station having a RAKE receiver comprising a plurality of RAKE fingers, and wherein the method further comprises allocating RAKE fingers among the sector antennas in the selected subset based on the signal strength measurements obtained for the sector antennas.

6. The method of claim 1, wherein the method is implemented by a base station associated with said CoMP cell, wherein a sector antenna comprises one or more physical antennas, and wherein the method further comprises:
   obtaining, from each physical antenna associated with a sector antenna in said set, data samples of a composite signal received by that physical antenna, the composite signal including uplink signals transmitted by one or more mobile terminals; and
   detecting the uplink signal transmitted by said mobile terminal, by jointly processing data samples obtained from the physical antennas associated with sector antennas in the selected subset.

7. The method of claim 6, wherein said base station has a RAKE receiver comprising a plurality of RAKE fingers, and wherein jointly processing data samples obtained from the physical antennas associated with sector antennas in the selected subset comprises:
   correlating those data samples to a spreading code assigned to said mobile terminal at a plurality of RAKE finger delays, to produce a plurality of despread values; and
   computing combining weights for combining the plurality of despread values, based on the selected subset.

8. The method of claim 7, wherein computing combining weights for combining the plurality of despread values, based on the selected subset, comprises forming and inverting an impairment covariance matrix that describes the correlation between the impairment on different fingers of the physical antennas associated with sector antennas in the selected subset.

9. The method of claim 1, wherein the method is implemented by a Radio Network Controller (RNC) in the wireless communication network, and wherein the method further comprises sending one or more control messages from the RNC to a base station associated with said CoMP cell, identifying to the base station the subset of sector antennas selected for CoMP reception of the uplink signal transmitted by said mobile terminal.

10. The method of claim 1, wherein at least two sector antennas in the set are deployed at different, geographically separated radio access points of said CoMP cell.

11. A network node in a wireless communication network supporting reduced-complexity coordinated multipoint (CoMP) reception of an uplink signal transmitted by a mobile terminal, the network node comprising a communications interface communicatively coupling the network node to said mobile terminal and one or more processing circuits configured to:
   obtain, for each sector antenna in a set of sector antennas deployed in a CoMP cell, a signal strength measurement of one or more downlink signals received by said mobile terminal from a sector associated with that sector antenna;
   compare the signal strength measurements obtained for sector antennas in the set; and
   select from the set, based on said comparison, a subset of sector antennas for CoMP reception of the uplink signal transmitted by said mobile terminal.

12. The network node of claim 11, wherein the one or more processing circuits are configured to select from the set, based on said comparison, a subset of sector antennas for CoMP reception of said uplink signal by selecting from the set a pre-determined number of sector antennas that are associated with sectors providing the strongest downlink signals to said mobile terminal, according to the signal strength measurements obtained.

13. The network node of claim 12, wherein the one or more processing circuits are further configured to refine the subset according to the signal strength measurements obtained by removing one or more sector antennas that are associated with sectors providing downlink signals having signal strength measurements below a pre-determined strength threshold.

14. The network node of claim 11, wherein the one or more processing circuits are configured to obtain a signal strength measurement of one or more downlink signals received by said mobile terminal from a sector by obtaining a signal strength measurement of a common pilot signal received by said mobile terminal from the sector.

15. The network node of claim 11, wherein the network node comprises a base station that is associated with said CoMP cell and that has a RAKE receiver comprising a plurality of RAKE fingers, and wherein the one or more processing circuits are further configured to allocate RAKE finger delays among the sector antennas in the selected subset based on the signal strength measurements obtained for the sector antennas.

16. The network node of claim 11, wherein the network node comprises a base station that is associated with said CoMP cell, wherein a sector antenna comprises one or more physical antennas, and wherein the one or more processing circuits are further configured to:
- obtain, from each physical antenna associated with a sector antenna in said set, data samples of a composite signal received by that physical antenna, the composite signal including uplink signals transmitted by one or more mobile terminals; and
- detect the uplink signal transmitted by said mobile terminal, by jointly processing data samples obtained from the physical antennas associated with sector antennas in the selected subset.

17. The network node of claim 16, wherein the base station has a RAKE receiver comprising a plurality of RAKE fingers, and wherein the one or more processing circuits are configured to jointly process data samples obtained from the physical antennas associated with sector antennas in the selected subset by:
- correlating those data samples to a spreading code assigned to said mobile terminal at a plurality of RAKE finger delays, to produce a plurality of despread values; and
- computing combining weights for combining the plurality of despread values, based on the selected subset.

18. The network node of claim 17, wherein the one or more processing circuits are configured to compute combining weights for combining the plurality of despread values, based on the selected subset by forming and inverting an impairment covariance matrix that describes the correlation between the impairment on different fingers of the physical antennas associated with sector antennas in the selected subset.

19. The network node of claim 11, wherein the network node comprises a Radio Network Controller (RNC) in the wireless communication network, and wherein the one or more processing circuits are further configured to send one or more control messages from the RNC to a base station associated with said CoMP cell, identifying to the base station the subset of sector antennas selected for CoMP reception of the uplink signal transmitted by said mobile terminal.

20. The network node of claim 11, wherein at least two sector antennas in the set are deployed at different, geographically separated radio access points of said CoMP cell.

* * * * *